United States Patent
Nagarajan et al.

(10) Patent No.: US 6,928,460 B2
(45) Date of Patent: Aug. 9, 2005

(54) METHOD AND APPARATUS FOR PERFORMING GENERATIONAL GARBAGE COLLECTION IN A SEGMENTED HEAP

(75) Inventors: Vijay G. Nagarajan, Los Gatos, CA (US); Robert Rochetti, Los Altos, CA (US); Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 514 days.

(21) Appl. No.: 10/189,054

(22) Filed: Jul. 1, 2002

(65) Prior Publication Data

US 2004/0003014 A1 Jan. 1, 2004

(51) Int. Cl.[7] .......................... G06F 12/00; G06F 17/30
(52) U.S. Cl. ..................................................... 707/206
(58) Field of Search ......................................... 707/206

(56) References Cited

U.S. PATENT DOCUMENTS

| | | | | |
|---|---|---|---|---|
| 5,845,298 A | * | 12/1998 | O'Connor et al. | 707/206 |
| 5,873,104 A | * | 2/1999 | Tremblay et al. | 707/206 |
| 5,873,105 A | * | 2/1999 | Tremblay et al. | 707/206 |
| 5,900,001 A | * | 5/1999 | Wolczko et al. | 707/206 |

(Continued)

OTHER PUBLICATIONS

Wilson, P.R. and T.G. Moher "A 'Card–Marking' Scheme for Controlling Intergerational References in Generation–Based Garbage Collection on Stock Hardware", ACM SIG-PLAN Notices, vol. 24, No. 5, May 1989, pp. 87–92.*

Hosking, A.L., J.E.B. Moss and D. Stefanovic "A Comparative Performance Evaluation of Write Barrier Implementation", ACM Conference on Object–Oriented Programming Systems Languages and Applications (OOPSLA '92), 1992, p. 92–109.*

Hosking, A.L. and R.L. Hudson "Remembered Sets Can Also Play Cards", ACM Conference on Object–Oriented Programming Systems Languages and Applications (OOPSLA '93), 1993.*

Hölzle "A Fast Write Barrier for Generational Garbage Collectors", ACM Conference on Object–Oriented Programming System Languages and Applications (OOPSLA '93), 1993.*

Printezis, T. and D. Detlefs "A Generationsl Mostly–Concurrent Garbage Collector", Proceedings of the $2^{nd}$ International Symposium on Memory Management, Oct. 15–16, 2000, pp. 143–154.*

(Continued)

*Primary Examiner*—Luke S Wassum
(74) *Attorney, Agent, or Firm*—Park, Vaughan & Fleming LLP; Edward J. Grundler

(57) ABSTRACT

One embodiment of the present invention provides a system that facilitates performing generational garbage collection on a heap. The system operates by dividing an old generation of the heap into segments. Next, the system divides each segment into a series of cards and associates a separate card table with each segment. This card table has an entry for each card in the segment. In a variation on this embodiment, while updating a pointer within an object in the old generation, the system locates the segment containing the object and accesses the card table for the segment. The system then marks the entry in the card table associated with the card containing the object.

30 Claims, 3 Drawing Sheets

U.S. PATENT DOCUMENTS

| | | | | |
|---|---|---|---|---|
| 5,903,900 | A | * | 5/1999 | Knippel et al. ............. 707/206 |
| 5,911,144 | A | * | 6/1999 | Schwartz et al. ........... 707/206 |
| 5,915,255 | A | * | 6/1999 | Schwartz et al. ........... 707/206 |
| 5,920,876 | A | * | 7/1999 | Ungar et al. ................ 707/206 |
| 5,930,807 | A | * | 7/1999 | Ebrahim et al. ............ 707/206 |
| 5,953,736 | A | * | 9/1999 | O'Connor et al. ............. 711/6 |
| 6,038,572 | A | * | 3/2000 | Schwartz et al. ........... 707/206 |
| 6,049,810 | A | * | 4/2000 | Schwartz et al. ........... 707/206 |
| 6,098,089 | A | * | 8/2000 | O'Connor et al. .......... 718/104 |
| 6,115,782 | A | * | 9/2000 | Wolczko et al. ............ 711/100 |
| 6,148,309 | A | * | 11/2000 | Azagury et al. ............ 707/206 |
| 6,148,310 | A | * | 11/2000 | Azagury et al. ............ 707/206 |
| 6,173,294 | B1 | * | 1/2001 | Azagury et al. ............ 707/206 |
| 6,185,581 | B1 | * | 2/2001 | Garthwaite ................. 707/206 |
| 6,199,075 | B1 | * | 3/2001 | Ungar et al. ................ 707/206 |
| 6,226,653 | B1 | * | 5/2001 | Alpern et al. ............... 707/206 |
| 6,249,793 | B1 | * | 6/2001 | Printezis et al. ............ 707/206 |
| 6,308,185 | B1 | * | 10/2001 | Grarup et al. .............. 707/206 |
| 6,317,756 | B1 | * | 11/2001 | Kolodner et al. ........... 707/206 |
| 6,415,302 | B1 | * | 7/2002 | Garthwaite et al. ......... 707/206 |
| 6,424,977 | B1 | * | 7/2002 | Garthwaite ................. 707/206 |
| 6,434,576 | B1 | * | 8/2002 | Garthwaite ................. 707/206 |
| 6,434,577 | B1 | * | 8/2002 | Garthwaite ................. 707/206 |
| 6,449,626 | B1 | * | 9/2002 | Garthwaite et al. ......... 707/206 |
| 6,470,361 | B1 | * | 10/2002 | Alpern et al. ............... 707/206 |
| 6,490,599 | B2 | * | 12/2002 | Kolodner et al. ........... 707/206 |
| 6,510,440 | B1 | * | 1/2003 | Alpern et al. ............... 707/206 |
| 6,526,422 | B1 | * | 2/2003 | Flood et al. ................. 707/206 |
| 6,529,919 | B1 | * | 3/2003 | Agesen et al. .............. 707/206 |
| 6,560,619 | B1 | * | 5/2003 | Flood et al. ................. 707/206 |
| 6,823,351 | B1 | * | 11/2004 | Flood et al. ................. 707/206 |
| 6,826,583 | B1 | * | 11/2004 | Flood et al. ................. 707/206 |
| 6,845,437 | B2 | * | 1/2005 | Borman et al. ............. 711/173 |
| 2002/0161792 | A1 | * | 10/2002 | Garthwaite ................. 707/206 |
| 2003/0033498 | A1 | * | 2/2003 | Borman et al. ............. 711/206 |

OTHER PUBLICATIONS

Flood, C.H. and D. Detlefs "Parallel Garbage Collection for Shared Memory Processors", Proceedings of the USENIX Java™ Virtual Machine Research and Technology Symposium (JVM '01), Apr. 23–24, 2001.*

Seligmann, J. and S. Grarup "Incremental Mature Garbage Collection Using the Train Algorithm", Proceedings of the 9th European Conference on Object–Oriented Programming (ECOOP '95), Aug. 1995, pp. 235–252.*

Jones, R. and R. Lins "Garbage Collection: Algorithms for Automatic Dynamic Memory Management", Chichester: John Wiley & Sons, 1996, Chapter 7, pp. 143–181. ISBN 0–471–94148–4. QA76.9.G37J66 1996.*

Azagury, A., E.K. Kolodner, E. Petrank and Z. Yehudai "Combining Card Marking with Remembered Sets: How to Save Scanning Time", ACM SIGPLAN Notices, vol. 34, No. 3, 1999, pp. 10–19.*

Borman, S. et al. "A Serially Reusable Java™ Virtual Machine Implementation for High Volume, Highly Reliable Transaction Processing", Technical Report TR29.3406, IBM, downloaded from www–1.ibm.com/servers/eserver/zseries/software/java/pdf/29.3406.pdf,2000.*

* cited by examiner

METHOD AND APPARATUS FOR PERFORMING GENERATIONAL GARBAGE COLLECTION IN A SEGMENTED HEAP

BACKGROUND

1. Field of the Invention

The present invention relates to managing memory within a computer system. More specifically, the present invention relates to a method and an apparatus for performing generational garbage collection in a segmented heap.

2. Related Art

Modem object-oriented programming systems typically allocate objects from a region of memory known as the "heap". When an object becomes unreachable because all references to the object have been removed, the object can no longer be used. However, the object continues to occupy memory space within the heap. At a later time, a "garbage collection" process reclaims this unused memory and makes it available to accommodate other objects. This garbage collection process may additionally perform compaction by rearranging objects in the heap to reduce memory fragmentation.

One of the most efficient types of garbage collectors is a "generational garbage collector". In a generational garbage collector, new objects are allocated in a "young generation" area of the heap. If an object continues to have references over a specified number of garbage collections cycles, the object is promoted to one or more old generation areas of the heap. A generational garbage collector performs garbage collection frequently on the young generation area of the heap, while performing garbage collection less frequently on old generation areas. This tries to match typical program behavior where most newly created objects are short-lived, and are thus reclaimed during garbage collection of the young generation. Long-lived objects in the old generation areas tend to persist in memory. Hence, the old generation areas need to be garbage collected less frequently. This greatly reduces the effort involved in garbage collection because only the young generation area of the heap needs to be garbage collected frequently.

FIG. 1 illustrates a young generation area 102 and an old generation area 104 within a heap. As is described above, a new object is initially allocated in young generation area 102. After a specified number of garbage collection cycles, if the object is still referenced, the object is promoted to old generation area 104. Old generation area 104 typically comprises a large contiguous area of memory that is divided into "cards". Each card contains a fixed amount of memory, such as $2^9$ bytes. Note that an object 114 within old generation area 104 can have a pointer an object 112 in young generation area 102.

When the system garbage collects young generation area 102, references from old generation area 104 to objects in young generation area 102 need to be located. To make locating these references easier, the system maintains a card table 106 that is associated with old generation area 104. When a pointer in old generation area 104 is updated, a corresponding entry in the card table 106 is marked. For example, FIG. 1 shows marked entry 110 in card table 106, which indicates that a pointer to an object in a corresponding card 108 has been updated. During garbage collection, only marked cards need to be examined for current references to objects in young generation area 102. This eliminates the need to scan through references in all of the old generation area 104, which can significantly improve performance of the garbage collection process.

The above-described method of garbage collection works well for an old generation area that is allocated in contiguous memory. A problem exists, however, in using this type of garbage collection technique in small, embedded systems do not support virtual memory. In this type of system, it is not practical to maintain a contiguous heap, which can be grown and shrunk depending on the dynamically changing requirements of applications running on these small systems.

What is needed is a method and an apparatus that provides the advantages of using card tables as described above without having to maintain a large contiguous heap.

SUMMARY

One embodiment of the present invention provides a system that facilitates performing generational garbage collection on a heap. The system operates by dividing an old generation of the heap into segments. Next, the system divides each segment into a series of cards and associates a separate card table with each segment. This card table has an entry for each card in the segment.

In a variation on this embodiment, the card table for a given segment is stored within the segment. This facilitates locating the card table.

In a variation on this embodiment, while updating a pointer within an object in the old generation, the system locates the segment containing the object and accesses the card table for the segment. The system then marks the entry in the card table associated with the card containing the object.

In a variation on this embodiment, dividing the old generation of the heap into segments involves dividing the old generation of the heap into segments along power-of-two address boundaries with power-of-two size.

In a variation on this embodiment, the system maintains a hot list of segments that hold objects recently promoted from the young generation to the old generation. The system adds a segment to the hot list when an object in the segment is promoted from the young generation to the old generation.

In a variation of this embodiment, an object that is larger than a normal segment is placed in a large segment by itself. This large segment includes only the large object.

In a variation of this embodiment, the large segment is not moved during heap compaction.

In a variation of this embodiment, the system maintains a list of segments in low-to-high address order to aid memory compaction.

In a variation of this embodiment, while promoting objects from the young generation to the old generation the system promotes the largest objects first. In doing so, the system iterates through segments to find a hole in the old generation that can hold an object from the young generation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Segmented Heap

Figure 1:
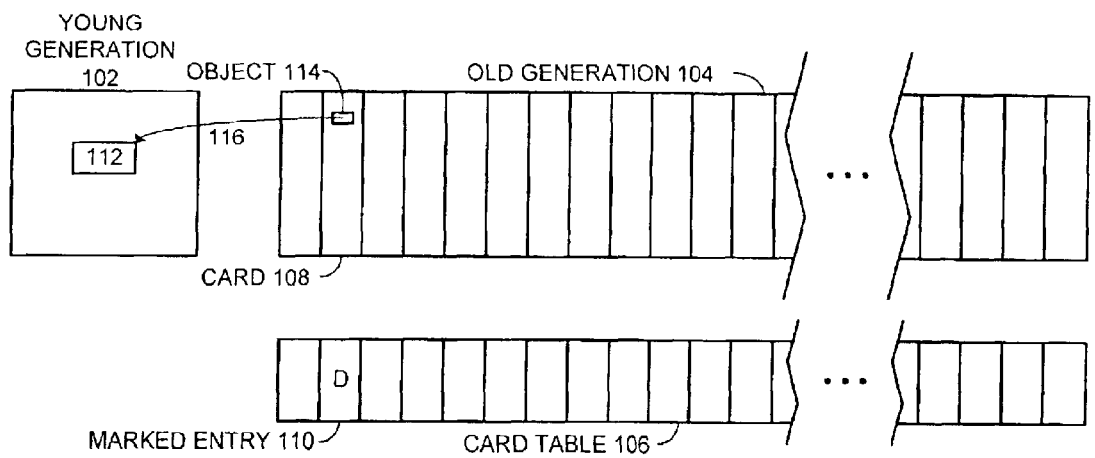
FIG. 1 illustrates a generational garbage collector.
Figure 2:
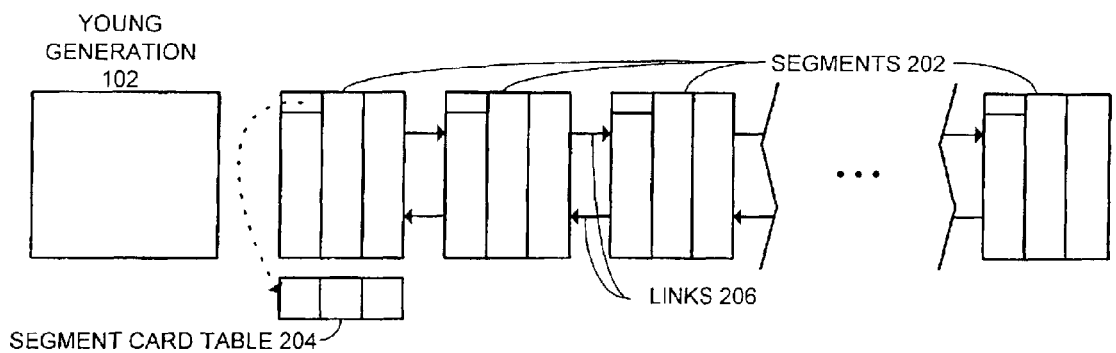
FIG. 2 illustrates a segmented heap in accordance with an embodiment of the present invention.

FIG. 2 illustrates a segmented heap in accordance with an embodiment of the present invention. Young generation area 102 is unchanged from the description above in conjunction with FIG. 1. The old generation area 104, however, is divided into segments 202. Dividing the old generation area 104 into segments allows the system to request and receive dynamic memory allocations from the operating system of the computer that are not necessarily part of a large, contiguous space. Allocating a large contiguous memory space on small, embedded systems is typically not possible because of the lack of advanced memory management features in these small systems. The segments are allocated in small chunks, for example 64 K-bytes, along power-of-two boundaries. Locating the segments on power-of-two boundaries simplifies the process of accessing the segments and their internal data structures as described below in conjunction with FIG. 4.

These segments are linked together from low address to high address in a doubly linked list with links 206 as shown in FIG. 2. Note that other methods of linking these segments together are possible.

Each segment is associated with a card table, such as segment card table 204. By including the card table associated with a segment in the segment, locating and updating the card table can be accomplished with primitive bit operations as described below in conjunction with FIG. 4. Note that maintaining a single monolithic card table for the entire heap would require time-consuming operations to locate entries in the card table, to update the card table, and also waste space covering unused portions of the native heap.

Virtual Machine

Figure 3:
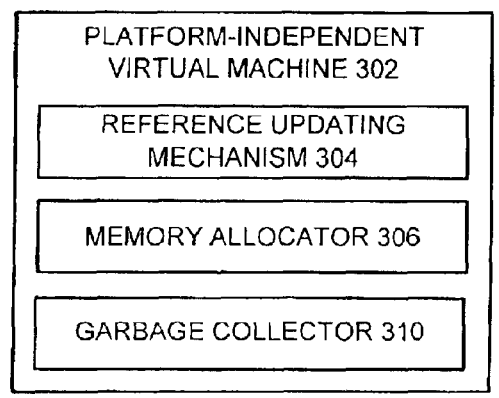
FIG. 3 illustrates platform-independent virtual machine in accordance with an embodiment of the present invention.

FIG. 3 illustrates platform-independent virtual machine 302 in accordance with an embodiment of the present invention. Platform-independent virtual machine 302 supports a typical, object-oriented system. For example, platform-independent virtual machine 302 can be a JAVA virtual machine. The terms JAVA, JVM, and JAVA VIRTUAL MACHINE are trademarks of SUN Microsystems, Inc. of Palo Alto, Calif. Platform-independent virtual machine 302 includes reference updating mechanism 304, memory allocator 306, and garbage collector 310.

Reference updating mechanism 304 receives object references, which need to be updated. The object references can be to existing objects or to new objects being allocated within young generation area 102. Upon receiving an object reference, reference updating mechanism 304 locates the proper entry in the old generation as described below in conjunction with FIG. 4 and marks the corresponding entry in the card table for the card holding the reference.

Memory allocator 306 accesses the memory management system of the underlying operating system to receive additional segments for the segmented old generation. These segments are typically 64 K-bytes in size and are aligned on 64 K-byte boundaries. However, if an object requires more than 64 K-bytes of memory, a large segment is allocated with sufficient memory to hold the object. This large object is the only object placed in this segment.

Garbage collector 310 operates in a manner similar to other garbage collectors for carded heaps. Garbage collector 310 examines the segment card tables located within the segments to determine cards that have marked entries. When garbage collector 310 promotes an object from the young generation to the segmented old generation, it first attempts to find a place within the old generation to hold the promoted object. If a space cannot be found, memory allocator 306 allocates a new segment and links it into the existing old generation. Note that garbage collector 310 maintains a hot-list (not shown) of segments containing recently promoted objects to facilitate rescanning to update links within these hot-listed segments.

During compaction of the old generation, large segments are not moved. Garbage collector 310 compacts the old generation into as few segments as possible and either releases unused segments to the operating system or maintains a list of unused segments for later use when more memory for allocating objects is required.

Addressing

Figure 4:
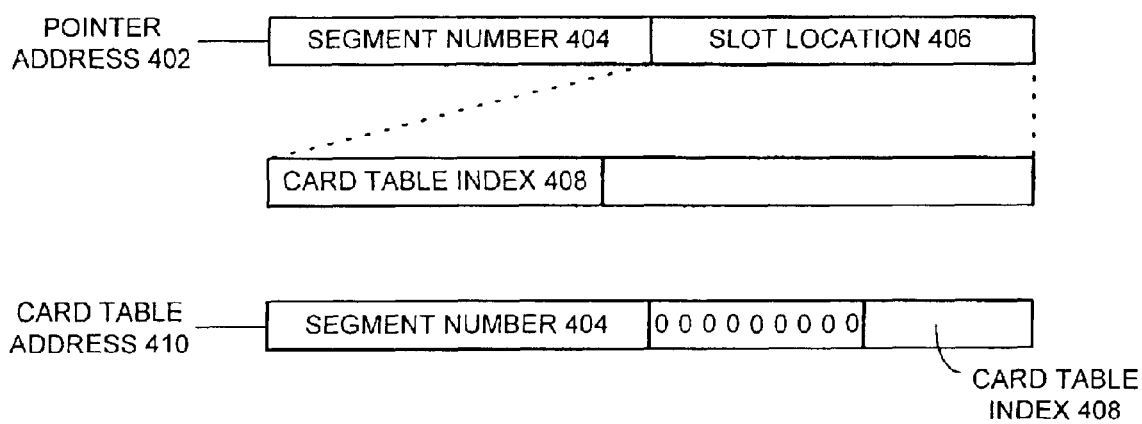
FIG. 4 illustrates pointer address in accordance with an embodiment of the present invention.

FIG. 4 illustrates pointer address 402 in accordance with an embodiment of the present invention. Pointer address 402 is the address of a pointer within the old generation, which needs to be updated. Reference updating mechanism 304 captures this address to update the card table entry for the card containing the pointer being updated.

Pointer address 402 is typically 32-bits in size. Since the segments are located on $2^{16}$-byte boundaries, the upper 16-bits of pointer address 402 form segment number 404, while the lower 16 bits form slot location 406 within the segment. Assuming $2^9$-byte card table entries, the upper 7-bits of slot location 406 identify card table index 408. Card table index 408 can be used to directly mark the proper card table entry for the updated card.

Card table address 410 is generated by concatenating segment number 404, nine zeros, and card table index 408. Card table address 410 can be used directly by reference updating mechanism 304 to update the card table entry for the updated card.

Marking Card Table Entries

Figure 5:
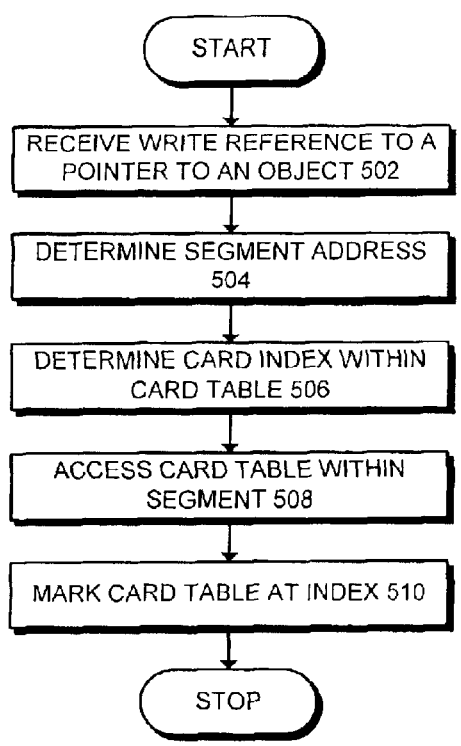
FIG. 5 is a flowchart illustrating the process of marking a card table in accordance with an embodiment of the present invention.

FIG. 5 is a flowchart illustrating the process of marking a card table in accordance with an embodiment of the present invention. The system starts when reference updating mechanism 304 receives a write reference to a pointer to an object (step 502). Reference updating mechanism 304 then determines the segment address by accepting the upper 16-bits of the pointer address (step 504). Next, reference updating mechanism 304 determines the card index within the card table by accepting the upper 7-bits of the slot location (step 506). Reference updating mechanism 304 then accesses the card table within the segment (step 508) and marks the card table at the index (step 510) specified by concatenating the various parts of the address as described above in conjunction with FIG. 4.

Promoting Objects

Figure 6:
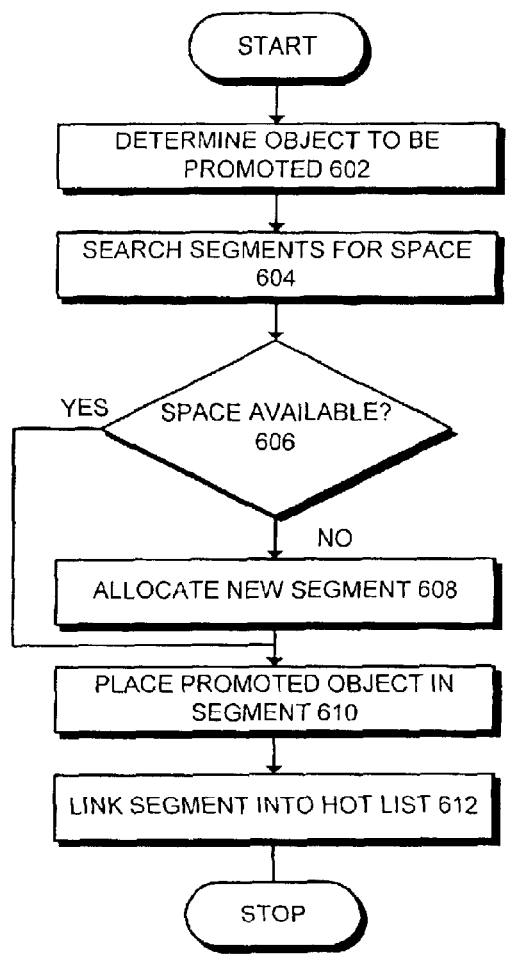
FIG. 6 is a flowchart illustrating the process of promoting objects from the young generation to the old generation in accordance with an embodiment of the present invention.

FIG. 6 is a flowchart illustrating the process of promoting objects from the young generation to the old generation in accordance with an embodiment of the present invention. The system starts when garbage collector 310 determines that an object should be promoted from the young generation to the old generation (step 602). Next, garbage collector 310 searches the available segments for space to place the promoted object (step 604). If space is not available (step 606), garbage collector 310 requests the allocation of a new segment from the operating system (step 608).

If space is available at step 606 or after allocating a new segment at step 608, garbage collector 310 places the promoted object into the segment (step 610). Garbage collector 310 then links the segment containing the newly promoted object into the hot list (Step 612).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing generational garbage collection on a heap, comprising:
    dividing an old generation of the heap into segments;
    dividing each segment into a series of cards; and
    associating a card table with each segment, wherein the card table has an entry for each card in the series of cards.

2. The method of claim 1, further comprising storing the card table for a segment within the segment.

3. The method of claim 2, wherein upon receiving an update to a pointer within an object in the old generation, the method further comprises:
    locating the segment containing the object;
    accessing the card table for the segment; and
    marking the entry in the card table associated with the card containing the object.

4. The method of claim 3, wherein during garbage collection, the method further comprises:
    locating an updated card in the old generation by inspecting the card table for a marked entry;
    examining pointers in the updated card; and
    establishing that objects pointed to by pointers in the updated card are still active.

5. The method of claim 1, wherein dividing the heap into segments involves dividing the heap in segments along power-of-two address boundaries.

6. The method of claim 5,
    wherein if a large object that is larger than the size of the segment requires storage, a large segment is allocated with sufficient memory to hold the object; and
    wherein the large segment stores only the large object.

7. The method of claim 6, wherein the large segment is not moved during a heap compaction.

8. The method of claim 1, further comprising:
    maintaining a hot list of segments that hold objects newly promoted from a young generation to the old generation; and
    adding an updated segment to the hot list when an object is promoted from the young generation to the old generation.

9. The method of claim 1, further comprising maintaining a list of segments, wherein the list of segments is maintained in low-to-high address order.

10. The method of claim 1, further comprising promoting objects from a young generation to the old generation by:
    selecting an object that can be promoted; and
    iterating through segments to find a hole in the old generation that can hold the selected object.

11. A computer-readable storage medium storing instructions that when executed by a computer cause the computer to perform a method for performing generational garbage collection on a heap, the method comprising:
    dividing an old generation of the heap into segments;
    dividing each segment into a series of cards; and
    associating a card table with each segment, wherein the card table has an entry for each card in the series of cards.

12. The computer-readable storage medium of claim 11, the method further comprising storing the card table for a segment within the segment.

13. The computer-readable storage medium of claim 12, wherein upon receiving an update to a pointer within an object in the old generation, the method further comprises:
    locating the segment containing the object;
    accessing the card table for the segment; and
    marking the entry in the card table associated with the card containing the object.

14. The computer-readable storage medium of claim 13, wherein during garbage collection, the method further comprises:
    locating an updated card in the old generation by inspecting the card table for a marked entry;
    examining pointers in the updated card; and
    establishing that objects pointed to by pointers in the updated card are still active.

15. The computer-readable storage medium of claim 11, wherein dividing the heap into segments involves dividing the heap in segments along power-of-two address boundaries.

16. The computer-readable storage medium of claim 15,
    wherein if a large object that is larger than the size of the segment requires storage, a large segment is allocated with sufficient memory to hold the object; and
    wherein the large segment stores only the large object.

17. The computer-readable storage medium of claim 16, wherein the large segment is not moved during a heap compaction.

18. The computer-readable storage medium of claim 11, the method further comprising:
    maintaining a hot list of segments that hold objects newly promoted from a young generation to the old generation; and
    adding an updated segment to the hot list when an object is promoted from the young generation to the old generation.

19. The computer-readable storage medium of claim 11, the method further comprising maintaining a list of segments, wherein the list of segments is maintained in low-to-high address order.

20. The computer-readable storage medium of claim 11, the method further comprising promoting objects from a young generation to the old generation by:

selecting an object that can be promoted; and iterating through segments to find a hole in the old generation that can hold the selected object.

21. An apparatus for performing generational garbage collection on a heap, comprising:

a dividing mechanism that is configured to divide an old generation of the heap into segments;

wherein the dividing mechanism is further configured to divide each segment into a series of cards; and an associating mechanism that is configured to associate a card table with each segment, wherein the card table has an entry for each card in the series of cards.

22. The apparatus of claim 21, further comprising a storing mechanism that is configured to store the card table for a segment within the segment.

23. The apparatus of claim 22, further comprising:

a locating mechanism that is configured to locate the segment containing an object;

an accessing mechanism that is configured to access the card table for the segment; and a marking mechanism that is configured to mark the entry in the card table associated with the card containing the object.

24. The apparatus of claim 22, further comprising:

a locating mechanism that is configured to locate an updated card in the old generation by inspecting the card table for a marked entry;

an examining mechanism that is configured to examine pointers in the updated card; and an establishing mechanism that is configured to establish that objects pointed to by pointers in the updated card are still active.

25. The apparatus of claim 21, wherein dividing the heap into segments involves dividing the heap in segments along power-of-two address boundaries.

26. The apparatus of claim 25, wherein if a large object that is larger than the size of the segment requires storage, a large segment is allocated with sufficient memory to hold the object; and wherein the large segment stores only the large object.

27. The apparatus of claim 26, wherein the large segment is not moved during a heap compaction.

28. The apparatus of claim 21, further comprising:

a hot list maintaining mechanism that is configured to maintain a hot list of segments that hold objects newly promoted from a young generation to the old generation; and an adding mechanism that is configured to add an updated segment to the hot list when an object is promoted from the young generation to the old generation.

29. The apparatus of claim 21, further comprising a list maintaining mechanism that is configured to maintain a list of segments, wherein the list of segments is maintained in low-to-high address order.

30. The apparatus of claim 21, further comprising:

a selecting mechanism that is configured to select an object that can be promoted; and an iterating mechanism that is configured to iterate through segments to find a hole in the old generation that can hold the selected object.

* * * * *